United States Patent [19]

Hamada et al.

[11] Patent Number: 4,723,141
[45] Date of Patent: Feb. 2, 1988

[54] CAMERA HAVING A PROVISION FOR MULTIPLE EXPOSURES

[75] Inventors: Hisashi Hamada, Tokyo; Katsuhiko Yamamoto, Saitama; Takeshi Yoshino, Saitama; Michihiro Shiina, Saitama; Shigenori Goto, Saitama; Masayoshi Hirai, Saitama; Shiro Hashimoto, Saitama, all of Japan

[73] Assignee: Fuji Photo Film Co., Ltd., Kanagawa, Japan

[21] Appl. No.: 928,713

[22] Filed: Nov. 7, 1986

[30] Foreign Application Priority Data

Nov. 7, 1985 [JP] Japan .............................. 60-247979
Jan. 14, 1986 [JP] Japan .................................. 61-5763

[51] Int. Cl.⁴ ............................................. G03B 17/24
[52] U.S. Cl. .................. 354/105; 354/173.1; 354/209
[58] Field of Search ............... 354/209, 105, 106, 109, 354/173.1

[56] References Cited

U.S. PATENT DOCUMENTS

| | | | |
|---|---|---|---|
| 4,191,463 | 3/1980 | Urano et al. | 354/209 |
| 4,332,447 | 6/1982 | Tsunefuji | 354/209 |
| 4,345,830 | 8/1982 | Aratame | 354/209 |
| 4,383,746 | 5/1983 | Aratame | 354/209 |
| 4,470,677 | 9/1984 | Tsujimoto et al. | 354/173.1 |
| 4,588,274 | 5/1986 | Kuzumi | 354/173.1 |

Primary Examiner—Russell E. Adams
Attorney, Agent, or Firm—Young & Thompson

[57] ABSTRACT

A camera having a provision for multiple exposures comprises an exposure mode setting member for selectively setting the camera operation either to an ordinary-exposure mode or to a multiple-exposure mode, a switch member which is rendered operative only when the exposure mode setting member selects the multiple-exposure mode and a one-frame film advance mechanism actuated by the operation of the switch member. This camera further comprises a data recording device for recording data such as the date on a film once every frame and a mark recording device for recording the same number of marks as there have been multiple exposures upon every exposure.

10 Claims, 9 Drawing Figures

CAMERA HAVING A PROVISION FOR MULTIPLE EXPOSURES

BACKGROUND OF THE INVENTION

The present invention relates to a camera which can make multiple exposures.

Recent still cameras allow automatic film advancement and shutter charging which are both performed by a built-in electric motor or a electric motor built into an autowinder unit adapted to be coupled to the camera. When making multiple exposures, it is indispensable to such automatic cameras to disconnect the film advancing system from the driving system operationally coupled to the motor before making an exposure. For this reason, the conventional automatic film advancing and shutter charging cameras are provided with clutch means for disconnecting the abovementioned systems when a multiple exposure is intended.

A problem with which the conventional automatic film winding and shutter charging cameras are attended is that, because no film winding occurs after the completion of multiple exposures, a frame given multiple exposures will be exposed accidentally one more time to the same or a different subject at the time of the next shutter release if the camera is left as it is. Therefore, it is necessary to perform an operation to reconnect the film winding and driving systems with the clutch means after the multiple exposures, then to make a blind exposure with a cap on the taking lens, and then to wind film by one frame. These successive operations are quite troublesome for photographers.

Another problem with conventional cameras, irrespective of what type they may be, is that it is hard to known from the processed film how many times a frame or frames have been exposed.

OBJECTS OF THE INVENTION

It is, therefore, an object of the present invention to provide a camera having provision for multiple exposures, in which a one-frame film advance can be made with ease after multiple exposure.

It is another object of the present invention to provide a camera having provision for multiple exposures, in which no blind exposure is required before a one-frame film advancement.

It is still another object of the present invention to provide a camera having provision for multiple exposures in which it is possible to record, on a film, the number of multiple exposures given to a frame as well as data such as the date.

It is a further object of the present invention to provide a camera having provision for multiple exposures in which data such as the data can be recorded without blurring irrespective of multiple exposure.

SUMMARY OF THE INVENTION

In accordance with the present invention, a camera is provided with an exposure mode setting dial adapted selectively to set the camera operation either to an ordinary-exposure mode or to a multiple-exposure mode, and a switch means which is caused to be operative only when the exposure mode set dial selects the multiple-exposure mode. When the switch means is operated, a one-frame film advance is caused without performing a shutter release operation.

The camera is further provided with a data recording device comprised of a data recording section and an exposed number recording section. The exposed number recording section comprises a mark-recording means which can form, on a film, a latent image of a mark indicating that a single exposure has been made, means for detecting the number of multiple exposures made before film advancement, and means for controlling the mark recording means so as to form the same number of latent mark images as of multiple exposures detected by the detecting means. The data recording section includes means for controlling data recording means known per se, to be actuated one time during multiple exposures.

BRIEF DESCRIPTION OF THE DRAWINGS

Other objects and advantages of the present invention will become apparent when the following detailed description of preferred embodiments and modifications thereof is read in conjunction with the accompanying drawings in which like reference numerals are used to indicate like parts throughout the drawings and in which.

DETAILED DESCRIPTION OF THE INVENTION

Because cameras are will known, the present description will be directed in particular to elements forming part of, or cooperating more directly with, apparatus in accordance with the present invention. It is to be understood that camera elements not specifically shown or described may take various forms well known to those skilled in the art.

Figure 1:
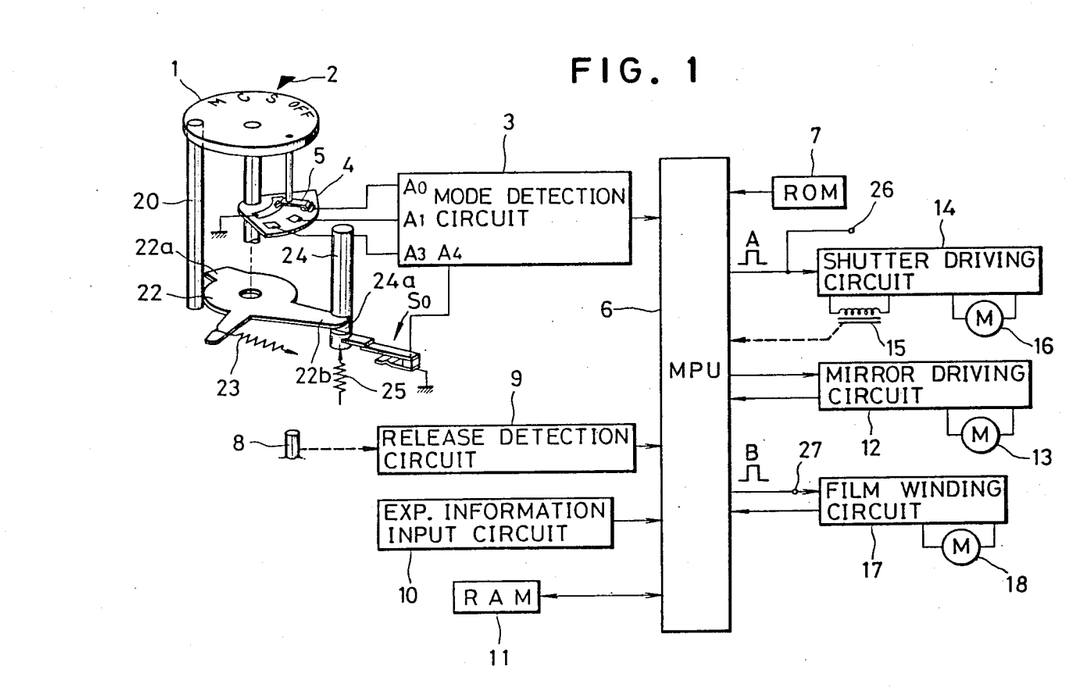
FIG. 1 is a schematic illustration of an essential part of the camera embodying the present invention which is shown partly in a perspective form and partly in a block diagram form.

Referring now to FIG. 1 showing a multipleexposure apparatus embodying the present invention, there is an exposure mode setting dial 1 with marks "OFF", "S", "C", and "M" which indicate camera operation modes, namely an inoperative mode, a single exposure mode, a continuous exposure mode and a multiple-exposure mode, respectively. The mode setting dial 1 is turned manually to align selectively any one of the marks with a camera mode index 2, thereby setting the camera operation to a corresponding exposure mode.

There is provided a selected mode detection means which is comprised of a slider 5 movable with the exposure mode setting dial 1, a plate 4 with printed contacts thereon, fixed to the camera body, and a mode detection circuit 3. Each exposure mode set by the exposure mode setting dail 1 can be detected as an electric signal (referred to hereinafter as a mode signal) by the mode detection circuit 3. The electric signal indicating the set mode information is transmitted to a micro-processing unit (abbreviated to MPU) 6 which controls the camera operation with reference to a sequence program stored in ROM 7 in accordance with the mode signal to execute a predetermined sequential camera operation for photographing.

When setting the exposure mode setting dial 1 either to the mode mark "S" or to the mode mark "C", the mode detection circuit 3 whose input at its terminals $A_0$ or $A_1$ is at a low level provides a single exposure signal at its output terminal.

In the presence of the single exposure signal at the output terminal of the mode detection circuit 3, a release detection circuit 9 provides a half-depression signal upon depressing a shutter release button 8 a half of its whole stroke, and transmits it to the MPU 6. Responsive to the half-depression signal transmission, the MPU 6 retrieves exposure information as to film speed, subject brightness and the like from an exposure information input circuit 10 to calculate, based thereon, a proper shutter speed and an aperture value for making a proper exposure which are temporarily stored in RAM 11.

When the shutter release button 8 is fully depressed its whole stroke, the release detection circuit 9 provides a trigger signal for starting the exposure operation. Specifically, upon emission of the trigger signal, a mirror drive circuit 12 is first caused to drive a motor 13 which makes a reflex mirror quickly swing up out of the optical path to a film in the camera. After a predetermined revolution of the motor 13 has fully swung up to reflex mirror, the MPU 6 provides an actuation signal A which in turn is transmitted to a shutter drive circuit 14 and a data recording device through a terminal 26, the latter being described in detail later in connection with FIGS. 2 to 5. The actuation signal A can actuate the shutter drive circuit 14 to cause the opeation of a solenoid 15 which allows shutter blades (not shown) to open and close under the control of the MPU 6 with reference to the exposure information stored in RAM 11, thereby making a proper exposure.

Responding to an end signal produced at the end of the operation of the solenoid, the MPU 6 then provides a charge signal which causes a motor 16 to start rotation for shutter charging in a well known manner. At the completion of this shutter charging, the MPU provides an actuating signal B which can actuate a film winding circuit 17 so as to cause the rotation of a motor 18 so as to advance a film 70 (see FIG. 4A) by one frame. The actuating signal B is transmitted simultaneously to the data recording circuit which will be described in detail later in connection with FIGS. 2 to 5. At the end of this one-frame film advance, an end signal is produced, responsive to which MPU 6 controls the film winding circuit 17 so as to stop the rotation of the motor 18, and the mirror driving circuit 12 so as to cause reverse rotation of the motor 13 for returning the reflex mirror quickly into the optical path to the film 70, and also re-establishing a viewfinder light path from a taking lens to a focusing screen. At the completion of all the above-described operations, the camera is ready for a next exposure.

The camera can be set to the multiple-exposure mode by turning the exposure mode setting dial 1 to the mode mark "M". The mode detection circuit 3, whose input at its terminal $A_3$ is at a low level, provides a multiple-exposure signal at its output terminal. Responding to the presence of the multiple exposure signal, the MPU 6 is, by referring to the sequence program stored in the ROM 7, prevented from providing the actuation signal B to the film winding circuit 17. Consequently, after the operation of the shutter button 8 for starting exposure, only the mirror and shutter driving circuits 12 and 14 are actuated, but they are operated in accordance with the same operation sequence as described for single exposure and continuous exposure. The film winding circuit 17 is rendered inoperative because of the absence of actuation signal B. In the multiple-exposure mode, the mirror and shutter can repeatedly operate the same number of times as the shutter release button 8 is operated, but without the operation of the film winding circuit 17, thereby allowing multiple exposures.

When the exposure mode setting dial 1 is turned from the mode mark "C" toward the mode mark "M", a pin 20 fixed to the back of the exposure mode setting dial 1 is brought into contact with an edge 22a of a locking plate 22 rotatably supported on the shaft of the exposure mode setting dial 1. A further rotation of the exposure mode setting dial 1 to the mode mark "M" causes the locking plate 22 to turn clockwise against a spring 23 so that an arm 22b of the locking plate 22 swings out of groove 24a formed in an actuation button 24, thereby permitting the actuation button to be depressed freely.

Under the actuation button 24 there is a switch $S_o$ which is turned ON by the depression of the actuation button 24 against the action of a spring 25 to provide a low level input at a terminal $A_4$ of the mode detection circuit 3. As a result, the mode detection circuit 3 provides a mode reset signal responsive to which the MPU 6 delivers, by referring to the sequence program stored in ROM 7, an actuation signal B to the film winding circuit 17. As a result, the film winding circuit 17 performs a one-frame film advance in the same manner as described hereinabove.

Reference is now had to FIGS. 2 to 5 showing a data recording device comprising a data recording section 41 and an exposure number recording section 42. As was described previously, an actuation signal A is provided at each completion of the swinging-up of the reflex mirror and is transmitted to the data recording device through the terminal 26.

Figure 2:
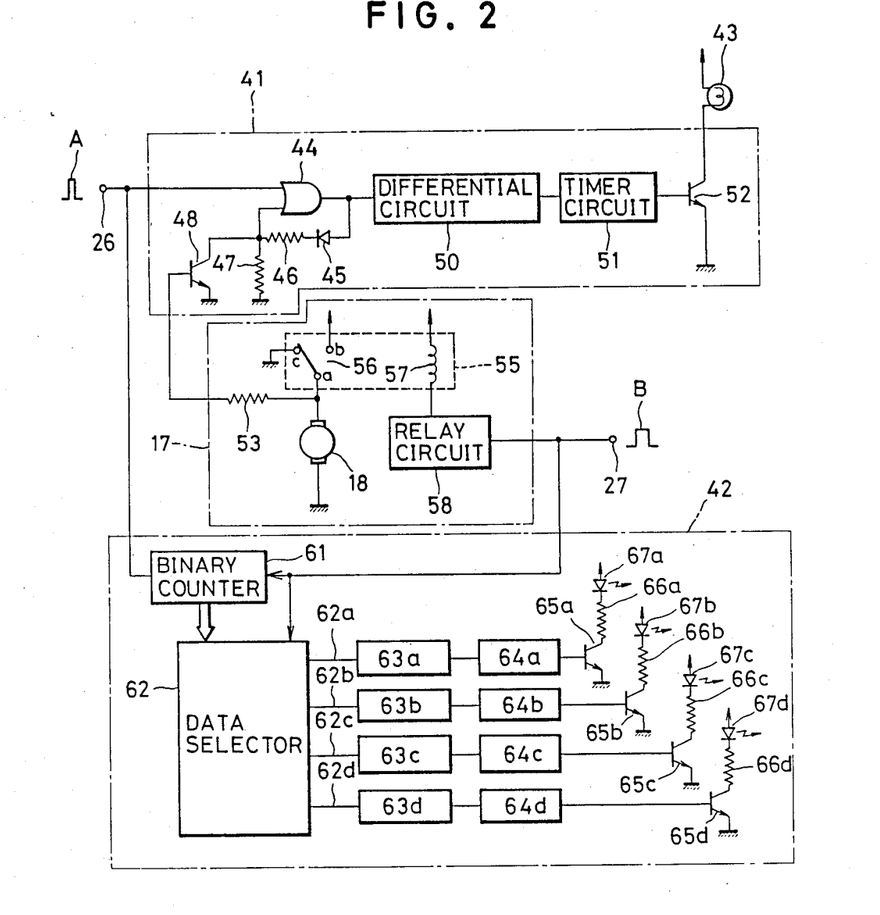
FIG. 2 is a circuit diagram showing a data recording device of the camera embodying the present invention.
Figure 3:
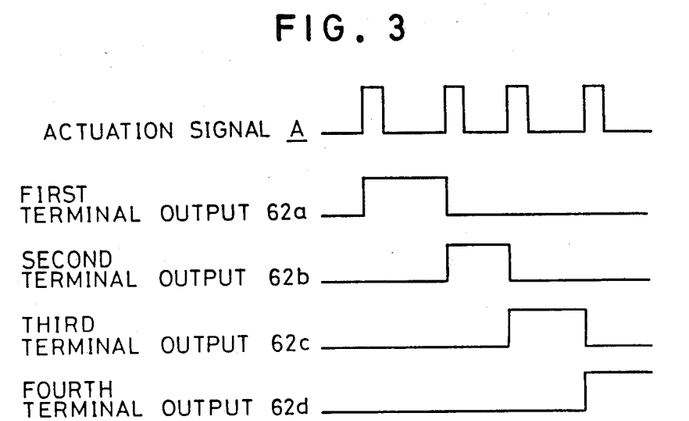
FIG. 3 is a diagram for explaining the operation of the data selector shown in FIG. 2.

The data recording section 41 is so arranged as to control an illumination lamp 43 to turn the same on and off in order to record data such as exposure data or the like on a film. At the input stage of the data recording section 41 there is an OR circuit 44 which is connected to the recording signal input terminal 26 at its one input terminal and, at its other input terminal, to its output terminal through a series circuit of a diode 45 and a resistance 46 as well as to the ground through a resistance 47 and the collector of a transistor 48. The transistor 48 is connected to the ground at its emitter and to the film winding circuit 17 at its base. When the transistor 48 is kept non-conductive, the OR circuit 44 holds its output at a high level once a recording signal A has been applied thereto because of the feed-back of the output through the diode 45 and the resistor 46. However, the OR circuit 44 is reset to provide its output at a low level when the transistor 48 is made conductive. Connected to the OR circuit 44 at its output terminal is a differential circuit 50 and a timer circuit 51 in series. The differential circuit 50 triggers the timer circuit 51 at the beginning of the rise of the output from the OR circuit 44 to a high level so as to hold the output of the timer circuit 51 at a high level for a period of time predetermined according to the speed of the film 70. As the timer circuit 51 at its output terminal is connected to the base of a transistor 52 with its collector connected to the illumination lamp 43 and its emitter connected to the ground, the timer circuit 51 keeps the transistor 52 conductive for the predetermined period of time after the application of a recording signal A to the input terminal 27, causing the illumination lamp 43 to turn on for that period of time.

The transistor 48 for resetting the OR circuit 44 has its base connected, through a resistance 53, to one pole of the film advancing motor 18 whose another pole is grounded. The same one pole of the film advancing motor 18 is connected to a common terminal a of a switching contact 56 of a relay 55. The switching contact 56 includes two selectable contact terminals b and c, one being connected to the power line and the other being grounded. The switching contact 56 is caused to select contact terminals b upon the energization of a relay coil 57 and the contact terminal c upon the deenergization of the same. The relay coil 57 is connected to the power line at one end and to a relay actuating circuit 58 at the other end. The actuation signal B which was previously described in connection with FIG. 1 is applied to the relay actuating circuit 58. As a result of the presence of the actuation signal B at the terminal 27, the relay coil 57 is energized to select the contact terminal b so as to start the rotation of the motor 18, thereby advancing the film by one frame.

The actuation signal A is also applied to the exposure number recording section 42, specifically to a binary counter 61 thereof which has a reset terminal connected to the terminal 27. This binary counter 61 is adapted to count up actuation signals A supplied thereto, until reset with an actuation signal B and to transmit its output in a binary form to a data selector 62 which has four output terminals 62a to 62d and a reset terminal connected to the terminal 27. This data selector 62, which decodes the binary output from the binary counter 62 to a decimal form, causes the first output terminal 62a to change a high level corresponding to the supply of an actuation signal A. If there is an actuation signal B supplied to the terminal 27, the data selector 62 is reset to cause the first output terminal 62a to change to a low level. However, if there is no actuation signal B at the terminal 27, the output terminals 62b, 62c and 62d change in sequence, as shown in FIG. 2, to a high level one each additional actuation signal A. Each output terminal 62a, 62b, 62c, 62d is connected to a differential circuit 63a, 63b, 63c, 63d, a timer circuit 64a, 64b, 64c, 64d and the base of a transistor 65a, 65b, 65c, 65d, in series. Each transistor 65a, 65b, 65c, 65d has its emitter grounded and its collector connected to the power line through a series connection of a resistor 66a, 66b, 66c, 66d and an LED 67a, 67b, 67c, 67d. The differential circuit 63a triggers the timer circuit at the beginning when the terminal 62a changes to a high level, causing it to provide a high level output for a period of time predetermined according to the speed of film. As a result, the transistor 67a is made conductive for that predetermined period of time, causing the LED 67a to emit light. In the same manner as described for the LED 67a, each LED 67b, 67c, 67d is caused to emit light for the same period of time when the corresponding output terminal 62b, 62c, 62d changes to a high level.

Figure 4A:
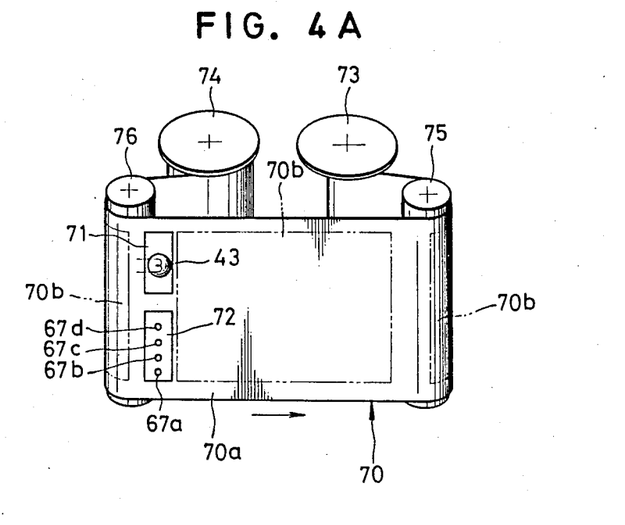
FIGS. 4A and 4B are explanatory illustrations showing the arrangement of the illumination lamp and the LED's shown in FIG. 2.
Figure 4B:
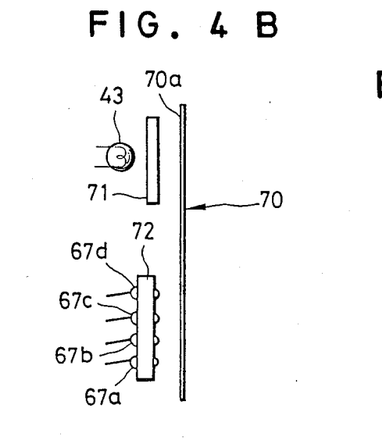
Figure 5:
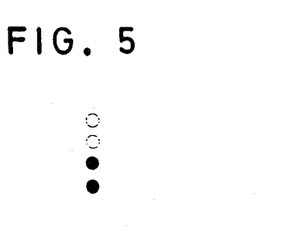
FIG. 5 is an illustration showing an example of mark images representing the number of multiple exposures.

As shown in FIGS. 4A and 4B, the illumination lamp 43 is so located as to illuminate a data carrier 71 bearing figures, letters and so forth to display a datum such as a date. Below the illumination lamp 43, there is located a base plate 72 on which the LEDs 67a to 67d are arranged in a line at regular intervals. These data carrier 71 and base plate 72 are so positioned as to face a stretch of a film 70 between two adjacent picture frames 70b. Therefore, when the lamp 43 is turned on to emit light, a latent image of a displayed datum on the data carrier 71 is formed on an upper portion of the light-sensitive surface 760a of said film 70. On the other hand, when each LED 67a, 67b, 67c, 67d is turned on to emit light, a latent image of a dot is formed in the same space at its lower portion, as is shown in FIG. 5. In FIG. 5, there are formed two dots as the result of the emission of light from the LEDs 67a and 67b, which means that the picture frame has been exposed twice.

In FIG. 4A, the film 30 is advanced in the direction shown by an arrow, namely from a film supply spool 74 to a film take-up spool 73 via guide rollers 75 and 76. The advance of the film 30 is effected by the motor 18 shown in FIG. 1 in the manner previously described.

After a multiple-exposure, the actuation button 24 (see FIG. 1) is depressed against the force of the spring 25 to close the switch $S_o$, thereby causing the terminal $A_4$ of the mode detection circuit 3 to change to a low level. As a result, an actuation signal B is applied to the terminal 27 to cause the film winding circuit 17, more specifically the relay circuit 58, to start the motor 18 to rotate so as to advance the film 70 by one frame. At the same time, the actuation signal B is applied also to the data selector 62 to reset the same.

The sequential operation of the camera in the multiple-exposure mode will be described hereinafter. At the outset, as the exposure mode setting dial 1 is turned to set the camera operation to the multiple-exposure mode, the mode detection circuit 3 whose terminal $A_3$ is caused to be at a low level prevents the MPU 6 from providing an actuation signal B to the film winding circuit 17, more specifically to the relay circuit 58, thereby preventing the motor 18 from rotating.

When a shutter release operation is performed, the MPU 6 provides an actuation signal A to the shutter driving circuit 14 after the completion of swinging up of the reflection mirror, so as to open and close the shutter. At the same time, the actuation signal A is applied to the terminal 26.

The presence of the actuation signal A at the terminal 26 causes the OR circuit 44 to provide a high level output, causing the transistor 52 to be conductive. As a result, the illumination lamp 43 is turned on to emit light for the mentioned predetermined period of time so as to illuminate the data carrier 71, thereby forming a latent image of a datum from the data carrier 71 on the upper part of the space between frames 70b.

On the other hand, upon the arrival of the actuation signal A at the terminal 26, the binary counter 61 counts one (1). The counted value is given to the data selector 62 and changes its terminal 62a to a high level, whereby the transistor 65a is made conductive for a predetermined period of time as was described previously and as is shown in FIG. 3, so as to allow the LED 67a to emit light for that period of time, thereby forming a latent image of a dot on the lower part of the same space as is formed with the data image.

When a second exposure is made on the same frame 70b, a second actuation signal A is applied to the terminal 26. At this time, because of the absence of actuation signal B at the terminal 27, the OR circuit 44 keeps the transistor 48 non-conductive so as to hold its output at a high level by the feedback circuit comprising the diode 45 and the resistance 46. Consequently, there is no trigger signal from the differential circuit 50, thereby preventing the transistor 52 from becoming conductive, and so there is no emission of light from the illumination lamp 43. On the other hand, upon the presence of the second actuation signal A at the terminal 26, the binary counter 61 counts two (2) so as to allow the LED 67b to emit light for the same period of time, thereby forming a latent image of a dot in the space between the frames 70b.

In the same manner as is described above, one latent image of a dot is formed on the mentioned extent of film for each actuation signal A at the terminal 26 without the emission of light from the illumination lamp 43 as long as the camera is kept in the multiple-exposure mode.

After an intended number of multiple exposures, the actuation button 24 is pushed. The MPU 6, with reference to the sequence program stored in ROM 7, provides an actuation signal B at the terminal 27. The presence of the actuation signal B causes the film winding circuit 17, and specifically the relay circuit 58, to energize the relay coil 57, so as to drive the motor 18 for one-frame film advancement and, simultaneously, reset the binary counter 61 and the data selector 62 to their initial condition. It is apparent that the energization of the relay coil 57 changes the transistor 48 to be conductive so as to turn the OR circuit 44 at its output to a low level.

When the camera is in either the single exposure mode or the continuous exposure mode, because an actuation signal B is produced every exposure, latent images of data and single dots are formed on a space between adjacent frames 70b.

It will be understood by those skilled in the art that the dot may be replaced with any shape of marks and that the images of data and dots may be formed not only in the upper and/or lower space of a frame but also within a frame.

Figure 6:
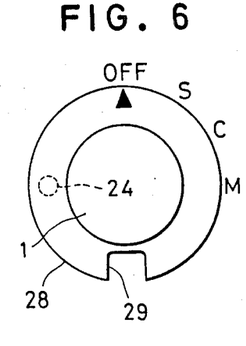
FIG. 6 is a plan view of an essential part of the camera of another embodiment of the present invention.
Figure 7:
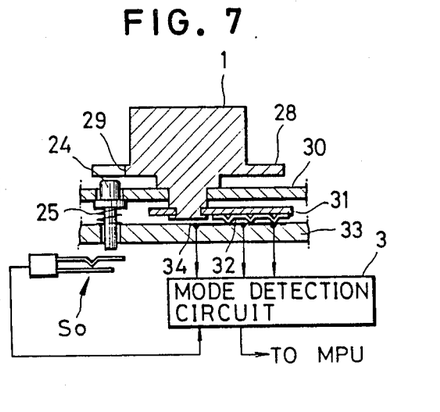
FIG. 7 is a cross sectional view of the essential part of the camera of FIG. 6.

FIGS. 6 and 7 show an essential part of the camera of another embodiment of the present invention in which the actuation button 24 is prevented from accidental operations when the camera is not set to the multiple-exposure mode. The exposure mode setting dial 1 has an integral flange 28 formed with a notch 29 for allowing access to the actuation button 24 only when the exposure mode set dial 1 is set to the multiple exposure mode "M", that is to say, the flange 28 prevents the actuation button 24 from being depressed when the exposure mode setting dial 1 is set to the single exposure mode, the continuous exposure mode and the inoperative mode. In this embodiment, the exposure mode setting dial 1 at its bottom has a disk-shaped plate 31 attached with a contact lug member 32 similar to the slider 5 shown in FIG. 1. The selective contact between the contact lug member 32 and the contacts of a contact printed plate 34 provide a signal corresponding to an exposure mode set by the exposure mode setting dial 1, the signal being detected by the mode detection circuit 3 in the same manner as is described as the previous embodiment.

FIG. 7 shows an essential part of the camera of a further embodiment of the present invention in which the switch $S_o$ is automatically turned ON in cooperation with the change in setting of the exposure mode setting dial 1, from the multiple-exposure mode to the continuous exposure mode. The exposure mode setting dial 1 has a flange 35 formed with a downwardly extending projection 36. In the path of the projection 36 when the exposure mode setting dial 1 is turned, there is a crank arm 38 supported on a shaft having an axis 37 of pivotal movement.

Figure 8:
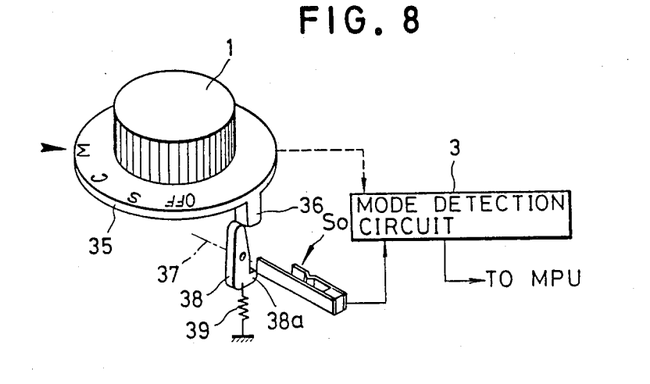
FIG. 8 is a perspective view of an essential part of the camera of still another embodiment of the present invention.

When the exposure mode setting dial 1 is turned from the position wherein the multiple-exposure mode shown in FIG. 8 is selected, to the position wherein the continuous-exposure mode is selected, the projection 36 pushes and turns the crank arm 38 counterclockwise against a spring 39, thereby causing the push end 38a to push closed the switch $S_o$. A further movement of the exposure mode setting dial 1 to the position wherein selecting the single-exposure mode or the inoperative mode, causes the projection 36 to ride across the top of the crank arm 38, thereby allowing the latter to return to the initial position shown in FIG. 8. On the other hand, when the exposure mode setting dial 1 is turned counterclockwise from the inoperative mode position or the single-exposure mode position to the multiple-exposure mode position via the continuous-exposure mode position, the projection 36 turns the crank arm 38 clockwise and rides across the top of the crank arm 38, allowing the crank arm 38 to return quickly to the initial position shown in FIG. 8 by means of the spring 39. Consequently the exposure mode setting dial 1 can by no means cause the switch $S_o$ to close unless it is turned from the multiple-exposure mode position to the continuous-exposure mode position.

According to the last-described embodiment, thanks to the fact that when the exposure mode set dial 1 is turned from the multiple-exposure mode position to any one of the other exposure mode positions after multiple exposures, one-frame film advancement is automatically effected, there is no possibility to make by mistake an unintended further exposure on the multiply exposed frame.

Because certain changes may be made in the abovedescribed camera without departing from the scope of the present invention, it is intended that all matter contained in the above description or shown in the accompanying drawings shall be interpreted as illustrative and not limiting.

What is claimed is:

1. A camera of the type in which the camera operation can be selectively set either to an ordinary-exposure mode or to a multiple-exposure mode and in which the number of multiple exposures of a film can be recorded, said camera comprising:
    means for recording a plurality of marks on a film, each mark indicating that a single exposure has been made;
    means for detecting the number of exposures made before a one-frame film advance; and
    means for controlling said mark-recording means to record the same number of marks as said number of exposures detected by said detecting means.

2. A camera as defined in claim 1, further comprising:
    means for recording, on said film, data comprising letters or figures; and
    means for causing said data-recording means to be operated only once during multiple exposures.

3. A camera of the type in which the camera operation can be set either to an ordinary-exposure mode wherein shutter charging and one-frame film advance are caused after every exposure or to a multiple-exposure mode wherein single-frame film advance is prevented for a plurality of exposures, said camera comprising:
- means for selectively setting said camera operation to either one of said ordinary- and multiple-exposure modes;
- switch means for allowing one-frame film advance, said switch means being rendered operation only when said setting means selects said multiple-exposure mode; and
- means for performing a said one-frame film advance upon the operation of said switch means.

4. A camera of the type in which the camera operation can be set either to an ordinary-exposure mode wherein shutter charging and one-frame film advance are both caused after every exposure or to a multiple-exposure mode wherein single-frame film advance is prevented for a plurality of exposures, said camera comprising:
- means for selectively setting said camera operation to either one of said ordinary- and multiple-exposure modes;
- manually operable switch means for providing a signal when said camera operation is in said multiple-exposure mode; and
- means responsive to said signal to effect a said one-frame film advance whilst leaving said camera operation in said multiple-exposure mode, thereby permitting multiple exposures on each of a plurality of successive frames of film.

5. A camera as defined in claim 4, and means for preventing operation of said switch means other than in said multiple-exposure mode.

6. A camera as defined in claim 5, said preventing means comprising locking means for preventing said switch means from operation and means for releasing said locking means only upon operation of said setting means to select said multiple-exposure mode.

7. A camera is defined in claim 4, wherein said switch means is so located as to allow access thereto only when said setting means select said multiple-exposure mode.

8. A camera as defined in claim 4, wherein said switch means is automatically operated when said setting means is turned from a position wherein it selects said multiple-exposure mode to a position wherein it selects said ordinary-exposure mode.

9. A camera of the type in which the camera operation can be set either to an ordinary-exposure mode wherein shutter charging and one-frame film advance are both caused after every exposure or to a multiple-exposure mode wherein single-frame film advance is prevented for a plurality of exposures, said camera comprising:
- means for selectively setting said camera operation to either one of said ordinary- and multiple-exposure modes; and
- means for recording on the film the number of multiple exposures of a frame that has been multiply exposed.

10. A camera of the type in which the camera operation can be set either to an ordinary-exposure mode wherein shutter charging and one-frame film advance are both caused after every exposure or to a multiple-exposure mode wherein single-frame film advance is prevented for a plurality of exposures, said camera comprising:
- means for selectively setting said camera operation to either one of said ordinary- and multiple-exposure modes; and
- means for recording on the film data every exposure in said ordinary-exposure mode and only once for a multiple exposure in said multiple-exposure mode.

* * * * *